United States Patent [19]

Ide

[11] 4,429,060

[45] * Jan. 31, 1984

[54] LIGHTWEIGHT HIGH PERFORMANCE FOAMS OF THERMOTROPIC LIQUID CRYSTAL POLYMERS COMPRISING RECURRING 6-OXY-2-NAPHTHOYL MOIETIES

[75] Inventor: Yoshiaki Ide, N. Plainfield, N.J.

[73] Assignee: Celanese Corporation, New York, N.Y.

[*] Notice: The portion of the term of this patent subsequent to Jan. 31, 2000 has been disclaimed.

[21] Appl. No.: 441,807

[22] Filed: Nov. 15, 1982

Related U.S. Application Data

[63] Continuation of Ser. No. 282,888, Jul. 13, 1981, abandoned.

[51] Int. Cl.$^3$ .................. C08J 9/08; C08J 9/10
[52] U.S. Cl. ........................ 521/182; 264/54; 521/185; 521/918
[58] Field of Search ............... 521/182, 185, 918

[56] References Cited

U.S. PATENT DOCUMENTS

| | | | |
|---|---|---|---|
| 4,161,470 | 7/1979 | Calundann | 260/40 R |
| 4,219,461 | 8/1980 | Calundann | 260/40 R |
| 4,224,264 | 9/1980 | Ort | 521/182 |
| 4,238,600 | 12/1980 | Jackson et al. | 521/191 |
| 4,256,624 | 3/1981 | Calundann | 260/40 R |

*Primary Examiner*—Morton Foelak
*Attorney, Agent, or Firm*—Burns, Doane, Swecker & Mathis

[57] ABSTRACT

High performance foams comprised of certain thermotropic liquid crystal polymers are provided. Such thermotropic liquid crystal polymers comprise not less than about 10 mole percent of recurring 6-oxy-2-naphthoyl moieties. The lightweight rigid foams exhibit a combination of excellent properties including enhanced mechanical properties such as high strength to weight ratio, high flame and thermal stability, and excellent solvent resistance. The foams fabricated from such polymers have significantly reduced anisotropy compared to unfoamed articles of the same polymers.

24 Claims, No Drawings

LIGHTWEIGHT HIGH PERFORMANCE FOAMS OF THERMOTROPIC LIQUID CRYSTAL POLYMERS COMPRISING RECURRING 6-OXY-2-NAPHTHOYL MOIETIES

This application is a continuation, of application Ser. No. 282,888, filed July 13, 1981, now abandoned.

BACKGROUND OF THE INVENTION

The present invention provides high performance foams comprised of liquid crystal polymers. The foams of the present invention exhibit enhanced mechanical properties.

Foamed plastics are very useful in those applications where enhanced mechanical properties such as a high strength to weight ratio is desirable.

There are many applications for lightweight high performance foamed articles in transportation vehicles, building materials, industrial equipment and business machines, among others. However, no industry demands more lightweight, high performance products than the transportation industry. Particularly in the automobile industry, the principal applications involve structural elements as well as applications under the hood. The structural elements such as trunks, hoods and doors require high mechanical properties. The under the hood applications require excellent resistance to solvents as well as the ability to resist high temperatures.

However, when conventional isotropic polymers are foamed for use in such applications, the advantageous reduction in weight is unfortunately accompanied by a significant reduction in desirable mechanical properties such as tensile strength, impact strength and initial modulus. Thus, the range of applications of foamed conventional plastics is rather limited.

It is known in the art that unfoamed articles of liquid crystal polymers fabricated by conventional methods such as extrusion or injection molding have very high anisotropy of physical properties between the machine direction (MD) and transverse direction (TD). This leads to very poor TD properties although the MD properties are very suitable. In addition, such articles have very distinct skin-core morphology across the cross section with the core being essentially unoriented.

It is also known that the highly aromatic liquid crystal polymers possess excellent high temperature stability and flame resistance as well as excellent solvent resistance and that foams of liquid crystal polymers may be provided. See U.S. Pat. Nos. 3,778,410; 3,804,805; 3,859,251; 3,890,256; 4,238,600; and published PCT application No. WO79/01030.

OBJECTS AND SUMMARY OF THE INVENTION

It is therefore an object of the present invention to provide lightweight rigid foams which exhibit a combination of excellent properties such as highly desirable mechanical properties as well as thermal, flame and solvent resistance.

It is a further object of the present invention to provide improved shaped structural articles comprised of high performance foams.

It is a still further object of the present invention to provide a foam comprised of certain thermotropic liquid crystal polymers.

It is a still further object of the present invention to provide a shaped structural article comprised of certain foamed liquid crystal polymers which exhibits high tensile strength, initial modulus and impact strength.

Accordingly, in accordance with the present invention, there is provided a foam which exhibits good thermal, flame and solvent stability and desirable mechanical properties which is comprised of a rigid foamed wholly aromatic polymer which is capable of forming an anisotropic melt phase and which comprises not less than about 10 mole percent of recurring units of the following moiety:

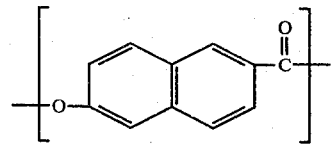

and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl and mixtures thereof.

DETAILED DESCRIPTION OF THE INVENTION

Thermotropic liquid crystal polymers are polymers which are liquid crystalline (i.e., anisotropic) in the melt phase. These polymers have been described by various terms, including "liquid crystalline", "liquid crystal" and "anisotropic". Briefly, the polymers of this class are thought to involve a parallel ordering of the molecular chains. The state wherein the molecules are so ordered is often referred to either as the liquid crystal state or the nematic phase of the liquid crystalline material. These polymers are prepared from monomers which are generally long, flat and fairly rigid along the long axis of the molecule and commonly have chain-extending linkages that are either coaxial or parallel.

Such polymers readily form liquid crystals (i.e., exhibit anisotropic properties) in the melt phase. Such properties may be confirmed by conventional polarized light techniques whereby crossed polarizers are utilized. More specifically, the anisotropic melt phase may be confirmed by the use of a Leitz polarizing microscope at a magnification of 40X with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

Those thermotropic liquid crystal polymers suitable for use in the present invention are wholly aromatic polymers such as wholly aromatic polyesters and wholly aromatic poly(ester-amide)s which are capable of forming an anisotropic melt phase and which comprise not less than about 10 mole percent of recurring units which include a 6-oxy-2-naphthoyl moiety. The wholly aromatic polyesters and wholly aromatic poly(ester-amide)s are considered to be "wholly" aromatic in the sense that each moiety present in the polymer contributes at least one aromatic ring to the polymer backbone.

Wholly aromatic polyesters which are preferred for use in the present invention and which satisfy the above characteristics are disclosed in commonly-assigned U.S. Pat. Nos. 4,161,470; 4,219,461 and 4,256,624; and in commonly-assigned U.S. Application Ser. Nos. 128,759, filed Mar. 10, 1980, now U.S. Pat. No. 4,299,756, 128,778, filed Mar. 10, 1980, now U.S. Pat. No. 4,279,803, 169,014, filed July 15, 1980, now U.S. Pat. No. 4,337,190, and 194,196, filed Oct. 6, 1980, now U.S. Pat. No. 4,318,841. Exemplary wholly aromatic poly(ester-amide)s are disclosed in commonly-assigned U.S. Applications Ser. No. 214,557, filed Dec. 9, 1980, now U.S. Pat. No. 4,330,457. The disclosures of all of the above-identified commonly-assigned U.S. patents and applications are herein incorporated by reference in their entirety. The wholly aromatic polyesters and poly(ester-amide)s disclosed therein typically are capable of forming an anisotropic melt phase at a temperature below approximately 400° C., and preferably below approximately 350° C.

As previously noted, the wholly aromatic thermotropic liquid crystal polymer employed in the foams of the present invention comprise not less than about 10 mole percent of recurring 6-oxy-2-naphthoyl moieties. The thermotropic liquid crystal polymer may be further comprised of additional moieties which contribute at least one aromatic ring to the polymer backbone and which enable the polymer to exhibit anisotropic properties in the melt phase. Such moieties include but are not limited to aromatic diols, aromatic diacids, aromatic amines and aromatic hydroxy acids such as:

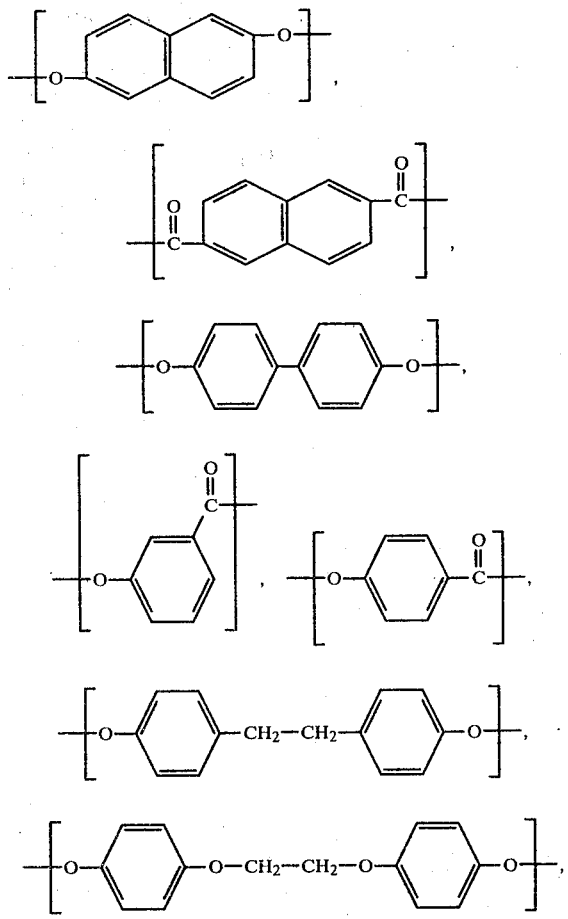

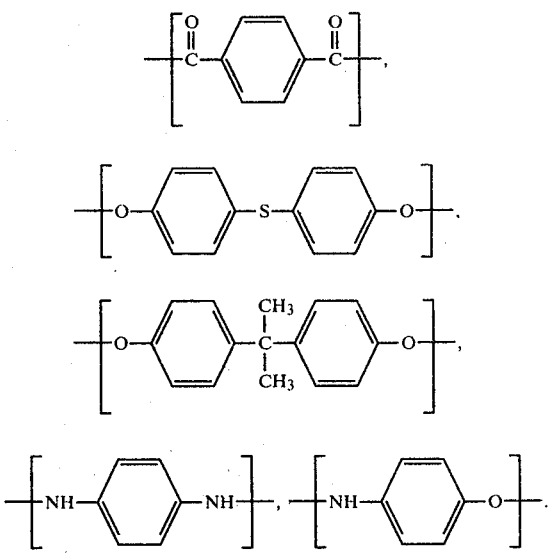

The respective moieties may be present in various proportions. For example, the polymer comprises at least about 10 mole percent of recurring 6-oxy-2-naphthoyl moieties, and preferably between about 10 to 90 mole percent of said moiety.

The wholly aromatic polyesters and poly(ester-amide)s which are suitable for use in the present invention may be formed by a variety of techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as said polymer particles are suspended therein. A vacuum may be applied to facilitate removal of volatiles formed during the final stage of the condensation (e.g., acetic acid or water).

Commonly-assigned U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent is incorporated herein by reference in its entirety. Although that patent is directed to the preparation of wholly aromatic polyesters, the process may also be employed to form poly(ester-amide)s.

When employing either the melt acidolysis procedure or the slurry procedure of U.S. Pat. No. 4,083,829, the organic monomer reactants from which the wholly aromatic polyesters and poly(ester-amide)s are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided. When poly(ester-amide)s are to be formed, an amine group may be provided as a lower acyl amide.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., BF$_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polyesters and poly(ester-amide)s suitable for use in the present invention tend to be substantially insoluble in common polyester solvents and accordingly are not susceptible to solution processing. As discussed previously, they can be readily processed by common melt processing techniques. Most suitable wholly aromatic polymers are soluble in pentafluorophenol to a limited extent.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic poly(ester-amide)s which are preferred for use in the present invention commonly exhibit a molecular weight of about 5,000 to 50,000, and preferably about 10,000 to 30,000; e.g., 15,000 to 17,000. Such molecular weight may be determined by gel permeation chromatography and other standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters and poly(ester-amide)s additionally commonly exhibit an inherent viscosity (i.e., I.V.) of at least approximately 2.0 dl./g., e.g., approximately 2.0 to 10.0 dl./g., when dissolved in a concentration of 0.1 percent by weight in pentafluorophenol at 60° C.

For the purposes of the present invention, the aromatic rings which are included in the polymer backbones of the polymer components may include substitution of at least some of the hydrogen atoms present upon an aromatic ring. Such substituents include alkyl groups of up to four carbon atoms; alkoxy groups having up to four carbon atoms; halogens; and additional aromatic rings, such as phenyl and substituted phenyl. Preferred halogens include fluorine, chlorine, and bromine. Although bromine atoms tend to be released from organic compounds at high temperatures, bromine is more stable on aromatic rings than on aliphatic chains, and therefore is suitable for inclusion as a possible substituent on the aromatic rings.

Especially preferred wholly aromatic polyesters are those which are disclosed in the above-identified U.S. Pat. No. 4,161,470. The wholly aromatic polyesters which are disclosed in U.S. Pat. No. 4,161,470 are melt processable wholly aromatic polyesters capable of forming an anisotropic melt phase at a temperature below approximately 350° C. The polyester consists essentially of the recurring moieties I and II wherein:

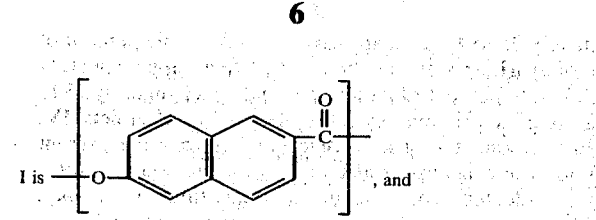

I is

, and

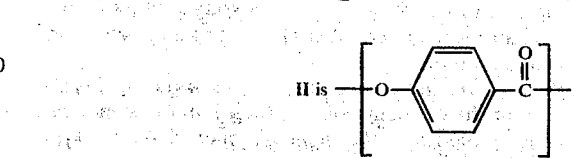

II is

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 75 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The polyester disclosed in U.S. Pat. No. 4,219,461 is a melt processable wholly aromatic polyester which is capable of forming an anisotropic melt phase at a temperature below approximately 320° C. The polyester consists essentially of the recurring moieties I, II, III, and IV wherein:

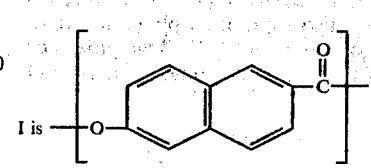

I is

,

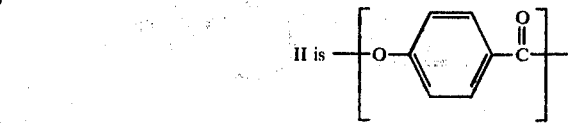

II is

,

III is a dioxy aryl moiety of the formula $\{O-Ar-O\}$ wherein Ar is a divalent radical comprising at least one aromatic ring, and IV is a dicarboxy aryl moiety of the formula

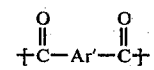

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV. The polyester preferably comprises approximately 20 to 30 (e.g., approximately 25) mole percent of moiety I, approximately 25 to 40 (e.g., approximately 35) mole percent of moiety II, approximately 15 to 25 (e.g., approximately 20) mole percent of moiety III, and approximately 15 to 25 (e.g., approximately 20) mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

Preferred dioxy aryl and dicarboxy aryl moieties are disclosed in U.S. Pat. No. 4,219,461. The preferred dioxy aryl moiety is:

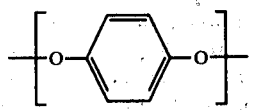

and the preferred dicarboxy aryl moiety is:

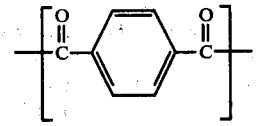

The polyester disclosed in U.S. Pat. No. 4,256,624 is a melt processable wholly aromatic polyester which is capable of forming an anisotropic melt phase at a temperature below approximately 400° C. The polyester consists essentially of the recurring moieties I, II, and III wherein:

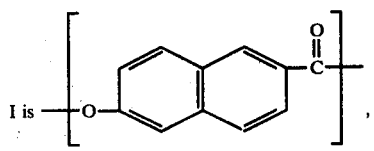

II is a dioxy aryl moiety of the formula $\{O-Ar-O\}$ where Ar is a divalent radical comprising at least one aromatic ring, and III is a dicarboxy aryl moiety of the formula

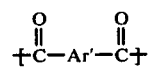

where Ar' is a divalent radical comprising at least one aromatic ring, and wherein the polyester comprises approximately 10 to 90 mole percent of moiety I, approximately 5 to 45 mole percent of moiety II, and approximately 5 to 45 mole percent of moiety III. The polyester preferably comprises approximately 20 to 80 mole percent of moiety I, approximately 10 to 40 mole percent of moiety II, and approximately 10 to 40 mole percent of moiety III. The polyester more preferably comprises approximately 60 to 80 mole percent of moiety I, approximately 10 to 20 mole percent of moiety II, and approximately 10 to 20 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixture thereof.

As with moieties III and IV of the polyester disclosed in U.S. Pat. No. 4,219,461, moieties II and III of the polyester described immediately above may be symmetrical or nonsymmetrical, but are preferably symmetrical.

Preferred moieties III and IV are set forth in the above-noted U.S. Pat. No. 4,256,624. The preferred dioxy aryl moiety III is:

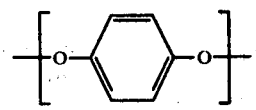

and the preferred dicarboxy aryl moiety IV is:

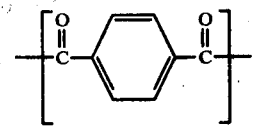

The polyester disclosed in the U.S. Patent Application Ser. No. 169,014 is a melt processable wholly aromatic polyester capable of forming an optically anisotropic melt phase at a temperature below approximately 400° C. consisting essentially of the recurring moieties I and II which may include substitution of at least some of the hydrogen atoms present upon an aromatic ring wherein:

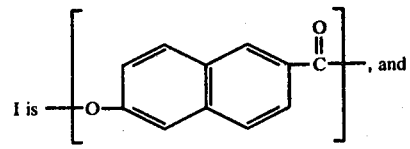

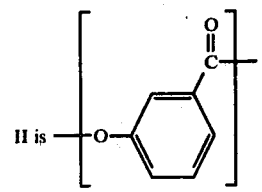

with said optional substitution if present being selected from the group consisting of an alkyl group of 1 to 4 carbon atoms, an alkoxy group of 1 to 4 carbon atoms, phenyl, substituted phenyl, halogen, and mixtures of the foregoing, and wherein said polyester comprises approximately 10 to 90 mole percent of moiety I, and approximately 10 to 90 mole percent of moiety II. The polyester preferably consists essentially of approximately 50 to 80 mole percent of moiety I and approximately 20 to 50 mole percent of moiety II.

The polyester disclosed in U.S. Patent Application Ser. No. 194,196 is a melt processable wholly aromatic polyester capable of forming an anisotropic melt phase at a temperature below approximately 350° C. consisting essentially of the recurring moieties I, II, III, and IV which may include substitution of at least some of the hydrogen atoms present upon an aromatic ring wherein:

I is 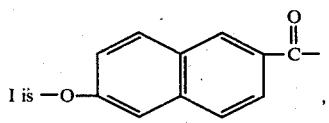

II is 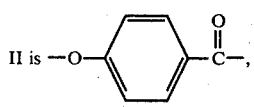

III is 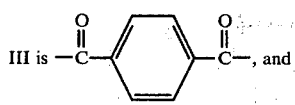, and

IV is 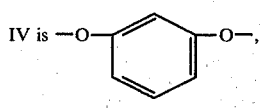, with said optional substitution if present on moieties I and II being selected from the group consisting of an alkyl group of 1 to 4 carbon atoms, an alkoxy group of 1 to 4 carbon atoms, halogen, and mixtures of the foregoing, and if present upon moieties III and IV being selected from the group consisting of an alkyl group of 1 to 4 carbon atoms, an alkoxy group of 1 to 4 carbon atoms, phenyl, substituted phenyl, halogen, and mixtures of the foregoing, and wherein said polyester comprises approximately 5 to 60 mole percent of moiety I, approximately 5 to 70 mole percent of moiety II, approximately 10 to 45 mole percent of moiety III, and approximately 10 to 45 mole percent of moiety IV. The polyester preferably consists essentially of approximately 15 to 25 mole percent of moiety I, approximately 25 to 35 mole percent of moiety II, approximately 20 to 30 mole percent of moiety III, and approximately 20 to 30 mole percent of moiety IV.

U.S. Application Ser. No. 214,557, filed Dec. 9, 1980, discloses, among others, a melt processable wholly aromatic poly(ester-amide) which is capable of forming an anisotropic melt phase at a temperature below approximately 400° C. The wholly aromatic poly(ester-amide) consists essentially of the recurring moieties I, II, III and optionally IV wherein:

I is 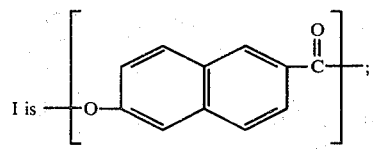;

II is 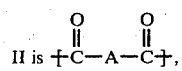, where A is a divalent radical comprising at least one aromatic ring;

III is $\{Y-Ar-Z\}$, where Ar is a divalent radical comprising at least one aromatic ring, Y is O, NH, or NR, and Z is NH or NR, where R is an alkyl group of 1 to 6 carbon atoms or an aryl group; and IV is $\{O-Ar'-O\}$, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Preferred moieties II, III and IV are set forth in above-noted U.S. Application Ser. No. 214,557. The preferred dicarboxy aryl moiety II is:

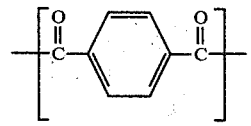

the preferred moiety III is:

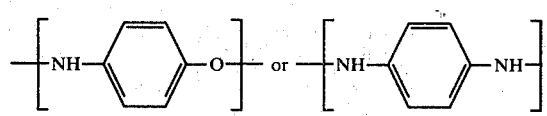

and the preferred dioxy aryl moiety IV is:

The foams of the present invention can be formed in any suitable conventional manner such as by extrusion, injection molding, etc. For example, a foam may be formed by screw extrusion by admixing pellets of a thermotropic liquid crystal polymer with a powdered blowing agent and extruding the admixture through an appropriate orifice (e.g., a slit die, etc.) at a temperature greater than the melting temperature of the polymer. The blowing agent decomposes at the temperature of extrusion to release a gas such as nitrogen or carbon dioxide within the extruded polymer melt to form the foam. The extruded foamed polymer is quenched or cooled by appropriate means such as forced air.

The particular extrusion apparatus used is not critical and any suitable apparatus may be used herein. Examples of suitable extrusion apparatus are described in *Plastics Engineering Handbook of the Society of the Plastics Industry*, Inc., Fourth Edition, edited by Joel Frados, Van Nostrand Reinhold Company (1976), pages 156-203.

The conditions of temperature and pressure under which the liquid crystal polymer can be extruded are not critical to the process of the present invention and can easily be determined by one of ordinary skill in the art. Typically, foamed thermotropic liquid crystal polymers can be extruded at a temperature within the range of approximately 250° C. to 350° C. (depending upon the melting temperature of the polymer) and at a pressure within the range of approximately 100 p.s.i. to 5,000 p.s.i.

The thermotropic liquid crystal polymers typically exhibit a density of about 0.1 to about 1.0 grams/cm$^3$ upon being foamed. Preferably, the density of the foamed polymer ranges from about 0.3 to about 0.7 grams/cm$^3$. In addition, the melting temperature of the foamed thermotropic liquid crystal polymer ranges from about 250° C. to about 320° C. depending upon the specific polymer employed.

The foamed liquid crystal polymers can be extruded to form a variety of structural articles. For example, the liquid crystal polymer can be extruded through a die to form a sheet. It is to be understood that the term "sheet" as used herein includes any of various relatively thin, substantially flat structures which may be known in the art as sheets or slabs, etc. The liquid crystal polymer can also be extruded through a suitable die to form a rod or tube (e.g., a pipe).

The foamed thermotropic liquid crystal polymers can also be employed to form molded structural articles such as by screw injection molding. An admixture of the blowing agent and the pelleted polymer are placed in the hopper of a screw injection molding apparatus wherein the admixture is heated to above the melting temperature of the polymer and injected into a suitable mold kept at a temperature substantially below the melting temperature of the polymer. The polymer is thereafter allowed to cool and separated from the mold. The injection molded foam exhibits desirable surface characteristics which permit the article to possess a wood-like appearance. The conditions of temperature and pressure under which the liquid crystal polymer can be molded are not critical and can easily be determined by one of ordinary skill in the art.

Conventional high temperature blowing agents can be employed to produce the foamed polymers. For example, suitable blowing agents include but are not limited to those marketed commercially under the tradenames Expandex 5 PT (comprised of 5-phenyltetrazole and marketed by Stepan Chemical Co.), Ficel THT (comprised of trihydrazine triazine and marketed by Fisons Industrial Chemicals), Celogen HT 550 (comprised of a hydrazine derivative and marketed by Uniroyal Chemical) and Kemtec 500 (marketed by Sherwin-Williams Chemicals). Such blowing agents decompose at a temperature within the range of about 240° to 310° C.

The decomposition of the blowing agent is a function of temperature as well as time. It is important to match the decomposition temperature with the processing temperature of the polymer. If the blowing agent decomposes before the polymer melts sufficiently, poor cell structure may be attained as well as an unsatisfactory surface appearance. The amount of blowing agent required ranges between about 0.1 percent by weight to several percent depending upon the gas yield of the blowing agent and the desired density reduction. Preferably, the concentration of the blowing agent will range between about 0.2 and about 0.5 percent by weight.

In addition, with the proper selection of chemical blowing agent, the foaming action can be controlled by controlling the temperature and/or the pressure. Control of the foaming action by temperature is more reliable than pressure and the use of a chemical blowing agent is thus preferred.

It is also possible that a suitable gas could be blown into the polymer melt to provide the foamed polymer. However, it is more difficult to ensure adequate dispersion of the gas by such a method.

Various fillers and reinforcing agents may also be employed to enhance various characteristics of the foamed polymer. For example, suitable reinforcing agents such as glass fibers may be employed to provide reinforcement for the foam. Such inorganic reinforcing agents generally may be employed in an amount up to about 50 percent by weight and preferably from about 10 to about 50 percent by weight based on the weight of the foam. In addition, other types of additives such as pigments, antioxidants and nucleating agents may be added. The amount of such fillers which are generally employed ranges approximately from 0.2 to 10 percent by weight and preferably ranges from about 0.5 to about 2 percent by weight.

The foams of the present invention exhibit enhanced mechanical properties due to the orientation of the polymer molecules. Specifically, the foams exhibit a reduced directional anisotropy. Foams having such a reduced directional anisotropy are self-reinforcing and have mechanical properties comparable to those of fiber-reinforced polymeric materials. The orientation of the polymer molecules around the closed cell bubbles of the foam is caused by the biaxial elongational flow field of expanding bubbles during the foaming process. The rod-like molecules of liquid crystal polymers can be easily oriented by such a flow field and the biaxial orientation can be retained.

As a result of this reduced directional anisotropy, the foams exhibit enhanced mechanical properties relative to the weight of the foam measured in the transverse direction (TD) in relation to the mechanical properties measured in the machine direction (MD).

The foams of the present invention also exhibit high flame and thermal stability and excellent solvent and chemical resistance as a result of the properties of the polymer employed therein. The polymers employed in the foams of the present invention also exhibit melting temperatures of sufficient magnitude (e.g., above about 250° C.) such that the foam is more amenable to heat treatment as discussed below. The foams of the present invention also carbonize upon being heated to sufficiently high temperatures which enhances the flame resistance of the foam.

The mechanical properties of foams produced in accordance with the present invention can be improved still further by subjecting the foams to a heat treatment following formation thereof. Note in this regard commonly-assigned U.S. Pat. application Ser. No. 441,655 of Yoshiaki Ide entitled "Heat Treated High Performance Foams of Thermotropic Liquid Crystal Polymers" filed Nov. 15, 1982. The heat treatment improves the properties of the foam by increasing the molecular weight of the liquid crystalline polymer and increasing the degree of crystallinity thereof while also increasing the melting temperature of the polymer. It has also been surprisingly found that it is possible to increase the melting temperature of the core of the foamed polymer to a greater degree in comparison to the increase in temperature exhibited by the core of the unfoamed polymer.

The foams may be thermally treated in an inert atmosphere (e.g., nitrogen, carbon dioxide, argon, helium) or alternatively, in a flowing oxygen-containing atmosphere (e.g., air). For instance, the foam may be brought to a temperature approximately 10° C. to 30° C. below the melting temperature of the foamed liquid crystal polymer, at which temperature the foam remains a solid object. It is preferable for the temperature of the heat treatment to be as high as possible without equaling or exceeding the melting temperature of the polymer. It is most preferable to gradually increase the temperature of heat treatment in accordance with the increase of the melting temperature of the polymer during heat treatment.

The duration of the heat treatment will commonly range from a few minutes to a number of days, e.g., from 0.5 to 200 hours, or more. Preferably, the heat treatment is conducted for a time of 1 to 48 hours and typically from about 5 to 30 hours.

Generally, the duration of heat treatment varies depending upon the heat treatment temperature; that is, a shorter treatment time is required as a higher treatment temperature is used. Thus, the duration of the heat treatment can be shortened for higher melting polymers, since higher heat treatment temperatures can be applied without melting the polymer.

In addition, the melting temperature of the foamed liquid crystal polymer can be increased from between about 20 to about 50 centigrade degrees as a result of the heat treatment, with the amount of increase which is obtained being dependent upon the temperature used in the heat treatment, with higher heat treatment temperatures giving greater increases.

The chemical resistance also increases with heat treatment and the solubility into pentafluorophenol, one of the rare solvents for thermotropic liquid crystal polymers, continuously decreases with increasing heat treatment time and eventually the material does not dissolve even minimally (such as in amounts of 0.1 percent by weight).

The invention is additionally illustrated in connection with the following Examples which are to be considered as illustrative of the present invention. It should be understood, however, that the invention is not limited to the specific details of the Examples.

EXAMPLE 1

Pellets of a thermotropic liquid crystal polymer comprised of 40 mole percent of p-oxybenzoyl units and 60 mole percent of 6-oxy-2-naphthoyl units of inherent viscosity 6.0 is admixed with 10 percent by weight of glass fibers as well as various amounts of a powdered Expandex 5-PT blowing agent and injection molded at a temperature of 280° C. into a mold at a temperature of 21° C. to form sample bars. The various sample bars produced by the molding process are examined to determine the tensile, flexural and impact properties of the bars. The tensile properties are determined in accordance with standard test ASTM D638, the flexural properties are determined in accordance with ASTM D790; and the impact properties are determined in accordance with ASTM D256. Samples 1-5 and Samples 6-10 are formed in molds of differing size which accounts for the variation in density reduction attained for the two groups of samples. The results of the examination are set forth in Tables I and II below:

TABLE I

Tensile Properties of Injection Molded Polymer (10% Glass)

| Sample | Blowing Agent Concentration (Wt. %) | Density (g/cc) | Tensile strength ($10^3$ psi) | Elongation (%) | Initial Modulus ($10^6$ psi) |
|---|---|---|---|---|---|
| 1 | None (unfoamed) | 1.51 | 23.1 | 3.21 | 1.49 |
| 2 | 0.2 | 1.18 | 18.0 | 2.64 | 1.25 |
| 3 | 0.5 | 1.16 | 15.0 | 1.80 | 1.25 |
| 4 | 1.0 | 1.20 | 17.5 | 2.34 | 1.27 |
| 5 | 2.0 | 1.17 | 16.0 | 1.98 | 1.25 |

TABLE II

Flexural and Impact Properties of Injection Molded Polymer (10% Glass)

| Sample | Blowing Agent Concentration (Wt %) | Density (g/cc) | Flexural Strength ($10^3$ psi) | Flexural Modulus ($10^6$ psi) | Izod Impact (ft.-lb/in.) |
|---|---|---|---|---|---|
| 6 | None (unfoamed) | 1.51 | 29.1 | 1.52 | 2.03 |
| 7 | 0.2 | 1.41 | 23.4 | 1.16 | 1.71 |
| 8 | 0.5 | 1.37 | 23.2 | 1.19 | 1.26 |
| 9 | 1.0 | 1.37 | 22.1 | 1.19 | 1.08 |
| 10 | 2.0 | 1.36 | 22.5 | 1.20 | 1.08 |

As shown by Example 1, structural articles comprised of foamed wholly aromatic thermotropic liquid crystal polymers of the present invention may exhibit a significantly reduced density compared with unfoamed polymers. However, the tensile, flexural and impact properties of the articles comprised of the foamed polymers are of sufficient magnitude to enable the structural articles to be employed successfully.

EXAMPLE 2

Pellets of a thermotropic liquid crystal polymer comprised of 25 mole percent of 6-oxy-2-naphthoyl units and 75 mole percent of p-oxybenzoyl units of inherent viscosity 9.9 is admixed with 0.2 percent by weight of a powdered Kemtec 500 blowing agents and 1.0 percent by weight of talc (a nucleating agent). The admixture is extruded at 307° C. from a sheet die of dimensions 10.15 cm × 1.65 mm and taken up at 0.37 meters/minute. A Koch static mixer is used just prior to extrusion of the admixture through the die to ensure uniform admixture of the blowing agent and the melt.

Sample bars are cut from the extruded foamed sheet and examined to determine their tensile properties in both the machine (MD) and transverse (TD) directions according to ASTM D638, Type V. Unfoamed sheets of comparable dimensions of the same polymer produced by the same method are also examined to determine their tensile properties. The average density of the foamed sheets is 0.77 grams/cc while the average density of the unfoamed sheets is 1.4 grams/cc. The tensile properties of five bars of both foamed and unfoamed samples are determined and averaged to yield composite values which are set forth in Tables III and IV below:

TABLE III

| Tensile Properties of Unfoamed Extruded Polymer of Example 2 | | | | | |
|---|---|---|---|---|---|
| Tensile Properties (MD) | | | Tensile Properties (TD) | | |
| Tensile Strength ($10^3$ psi) | Elongation (%) | Initial Modulus ($10^6$ psi) | Tensile Strength ($10^3$ psi) | Elongation (%) | Initial Modulus ($10^6$ psi) |
| 28.2 | 1.90 | 2.07 | 10.5 | 11.5 | 0.420 |

TABLE IV

| Tensile Properties of Foamed Polymer of Example 2 | | | | | |
|---|---|---|---|---|---|
| Tensile Properties (MD) | | | Tensile Properties (TD) | | |
| Tensile Strength ($10^3$ psi) | Elongation (%) | Initial Modulus ($10^6$ psi) | Tensile Strength ($10^3$ psi) | Elongation (%) | Initial Modulus ($10^6$ psi) |
| 5.00[a] | 2.28 | 0.398 | 4.65 | 6.49 | 0.261 |
| 9.33[b] | 2.28 | 0.743 | 8.68 | 6.49 | 0.487 |

[a] as extruded
[b] corrected to a density of 1.4 grams/cc (i.e., average density of unfoamed samples)

Example 2 demonstrates that the foams of the present invention also exhibit enhanced mechanical properties (relative to the weight of the foam) in the transverse direction (TD) in relation to the mechanical properties measured in the machine direction (MD). For example, when corrected for density reduction, the tensile strength of the foamed polymer measured in the transverse direction substantially equals the corresponding value for the unfoamed sheet (8.68 vs. 10.50) while the initial modulus exceeds the corresponding value for the unfoamed sheet (0.487 vs. 0.420).

In addition, the tensile properties (TD) decrease proportionally less than do the tensile properties (MD) for the foamed polymer in comparison to the corresponding tensile properties for the unfoamed polymer. Thus, the foamed polymer, while its tensile properties are reduced as a result of being foamed, is actually proportionally stronger in the transverse direction (TD) in comparison to the machine direction (MD) as a result of the foaming. In effect, the tensile properties become more multi-dimensional (i.e., exhibits a more balanced anisotropy) which permits the foamed polymer to be employed in applications where multi-directional tensile strength is desirable.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A polymer foam which exhibits good thermal stability, flame and solvent resistance and desirable mechanical properties such as high strength comprising a rigid foamed wholly aromatic polyester which exhibits anisotropic properties in the melt phase and consists of monomers having chain extending linkages that are either coaxial or parallel and which comprises not less than about 10 mole percent of recurring units of the moiety:

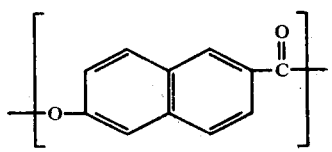

and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl and mixtures thereof.

2. The foam of claim 1 wherein said wholly aromatic polyester exhibits an inherent viscosity of at least 2.0 dl./g. when dissolved in a concentration of 0.1 percent by weight in pentafluorophenol at 60° C.

3. The foam of claim 2 wherein said wholly aromatic polyester exhibits an inherent viscosity of approximately 2.0 to approximately 10.0 dl./g. when dissolved in a concentration of 0.1 percent by weight in pentafluorophenol at 60° C.

4. The foam of claim 1 wherein said wholly aromatic polyester is capable of forming an anisotropic melt phase at a temperature below approximately 400° C.

5. The foam of claim 1 wherein said moiety is present in an amount of at least about 20 mole percent.

6. The foam of claim 1 wherein said foam has a density of from about 0.1 to about 1.0 gms/cm$^3$.

7. The foam of claim 6 wherein said foam has a density of from about 0.3 to about 0.7 gms/cm$^3$.

8. The foam of claim 1 wherein said wholly aromatic polyester is a wholly aromatic poly(ester-amide).

9. The foam of claim 1 wherein said wholly aromatic polyester comprises a melt processable wholly aromatic polyester which is capable of forming an anisotropic melt phase and consists essentially of the recurring moieties I and II wherein:

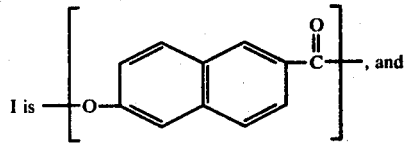

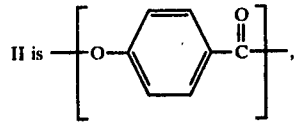

wherein said polyester comprises approximately 10 to 90 mole percent of moiety I, and approximately 10 to 90 mole percent of moiety II and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

10. The foam of claim 9 wherein said polyester comprises approximately 65 to 85 mole percent of moiety II.

11. The foam of claim 9 wherein said polyester comprises approximately 15 to 35 mole percent of moiety II.

12. The foam of claim 1 wherein said wholly aromatic polyester comprises a melt processable wholly aromatic polyester which is capable of forming an anisotropic melt phase and consists essentially of the recurring moieties, I, II, III, and IV wherein:

I is 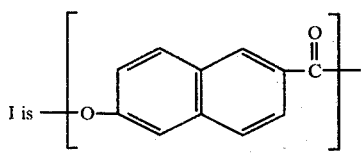,

II is 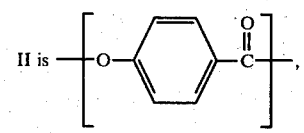,

III is a dioxyaryl moiety of the formula $\text{+O—Ar—O+}$ where Ar is a divalent radical comprising at least one aromatic ring, and IV is a dicarboxy aryl moiety of the formula

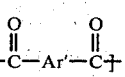

where Ar' is a divalent radical comprising at least one aromatic ring, and wherein said polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

13. The foam of claim 12 wherein said polyester comprises approximately 20 to 30 mole percent of moiety I, approximately 25 to 40 percent of moiety II, approximately 15 to 25 mole percent of moiety III, and approximately 15 to 25 mole percent of moiety IV.

14. The foam of claim 1 wherein said wholly aromatic polyester comprises a melt processable wholly aromatic polyester which is capable of forming an anisotropic melt phase and consists essentially of the recurring moieties, I, II, and III wherein:

I is 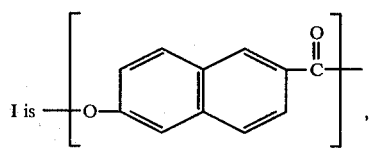,

II is a dioxy aryl moiety of the formula $\text{+O—Ar—O+}$ where Ar is a divalent radical comprising at least one aromatic ring, and III is a dicarboxy aryl moiety of the formula

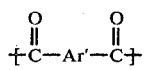

where Ar' is a divalent radical comprising at least one aromatic ring, and wherein said polyester comprises approximately 10 to 90 mole percent of moiety I, approximately 5 to 45 mole percent of moiety II, and approximately 5 to 45 mole percent of moiety III and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

15. The foam of claim 14 wherein said polyester comprises approximately 20 to 80 mole percent of moiety I, approximately 10 to 40 mole percent of moiety II, and approximately 10 to 40 mole percent of moiety III.

16. The foam of claim 1 wherein said wholly aromatic polyester is a melt processable wholly aromatic polyester capable of forming an anisotropic melt phase consisting essentially of the recurring moieties I and II which may include substitution of at least some of the hydrogen present upon an aromatic ring wherein:

I is 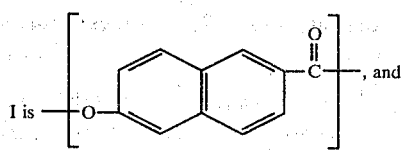, and

II is 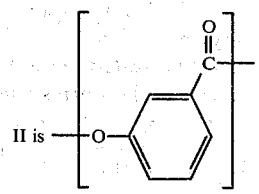

with said optional substitution if present being selected from the group consisting of an alkyl group of 1 to 4 carbon atoms, an alkoxy group of 1 to 4 carbon atoms, phenyl, substituted phenyl, halogen, and mixtures of the foregoing, and wherein said polyester comprises approximately 10 to 90 mole percent of moiety I, and approximately 10 to 90 mole percent of moiety II.

17. The foam of claim 16 wherein said polyester comprises approximately 50 to 80 mole percent of moiety I and approximately 20 to 50 mole percent of moiety II.

18. The foam of claim 1 wherein said polyester comprises a melt processable wholly aromatic polyester capable of forming an anisotropic melt phase consisting essentially of the recurring moieties I, II, III, and IV which may include substitution of at least some of the hydrogen atoms present upon an aromatic ring wherein:

I is 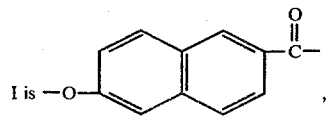,

II is 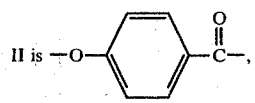,

III is 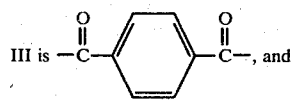, and

IV is 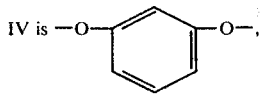

with said optional substitution if present on moieties I and II being selected from the group consisting of an alkyl group of 1 to 4 carbon atoms, an alkoxy group of 1 to 4 carbon atoms, halogen, and mixtures of the foregoing, and if present upon moieties III and IV being selected from the group consisting of an alkyl group of 1 to 4 carbon atoms, an alkoxy group of 1 to 4 carbon atoms, phenyl, substituted phenyl, halogen, and mixtures of the foregoing, and wherein said polyester comprises approximately 5 to 60 mole percent of moiety I, approximately 5 to 70 mole percent of moiety II, approximately 10 to 45 mole percent of moiety III, and approximately 10 to 45 mole percent of moiety IV.

19. The foam of claim 18 wherein said polyester comprises approximately 15 to 25 mole percent of moiety I, 25 to 35 mole percent of moiety II, approximately 20 to 30 mole percent of moiety III, and approximately 20 to 30 mole percent of moiety IV.

20. The foam of claim 1 wherein said polymer comprises a wholly aromatic poly(ester-amide) which is capable of forming an anisotropic melt phase and consists essentially of the recurring moieties I, II, III and optionally IV wherein:

I is 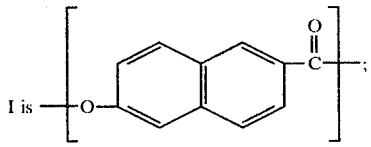

II is 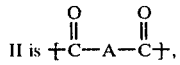, where A is a divalent radical comprising at least one aromatic ring;

III is $\{Y-Ar-Z\}$, where Ar is a divalent radical comprising at least one aromatic ring, Y is O, NH, or NR, and Z is NH or NR, where R is an alkyl group of 1 to 6 carbon atoms or an aryl group; and IV is $\{O-Ar'-O\}$, where Ar' is a divalent radical comprising at least one aromatic ring; and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV, and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

21. The foam of claim 1 wherein said foam is in the form of a sheet.

22. The foam of claim 1 wherein said foam is in the form of a tube.

23. The foam of claim 1 wherein said foamed polymer includes a reinforcing agent.

24. The foam of claim 23 wherein said reinforcing agent comprises fibers.

* * * * *